(No Model.)

F. C. MERRILL.

SWIVEL PLOW.

No. 353,696. Patented Dec. 7, 1886.

2 Sheets—Sheet 1.

Witnesses:

Inventor.

(No Model.) 2 Sheets—Sheet 2.
F. C. MERRILL.
SWIVEL PLOW.
No. 353,696. Patented Dec. 7, 1886.
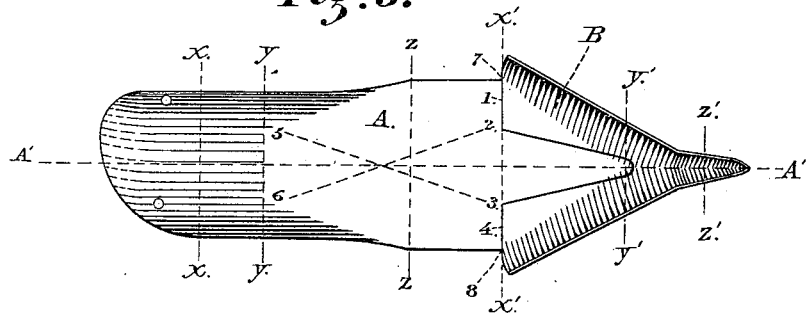
Fig. 3.
Fig. 4.
   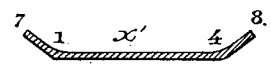
Fig. 5.  Fig. 6.  Fig. 7.  Fig. 8.
 
Fig. 9.  Fig. 10.
Witnesses:
Abner H. Davis
Aug. L. Smith
Inventor.
Freeman C. Merrill
by Geo. B. Bird, atty

UNITED STATES PATENT OFFICE.

FREEMAN C. MERRILL, OF PARIS, MAINE.

SWIVEL-PLOW.

SPECIFICATION forming part of Letters Patent No. 353,696, dated December 7, 1886.

Application filed August 20, 1886. Serial No. 211,362. (No model.)

*To all whom it may concern:*

Be it known that I, FREEMAN C. MERRILL, of Paris, in the county of Oxford and State of Maine, have invented certain new and useful Improvements in Swivel-Plows; and I do hereby declare that the following is a full, clear, and exact description of the invention, that will enable others skilled in the art to which it appertains to make and use the same, reference being had to the accompanying drawings, forming a part of this specification, in which—

Figure 1:
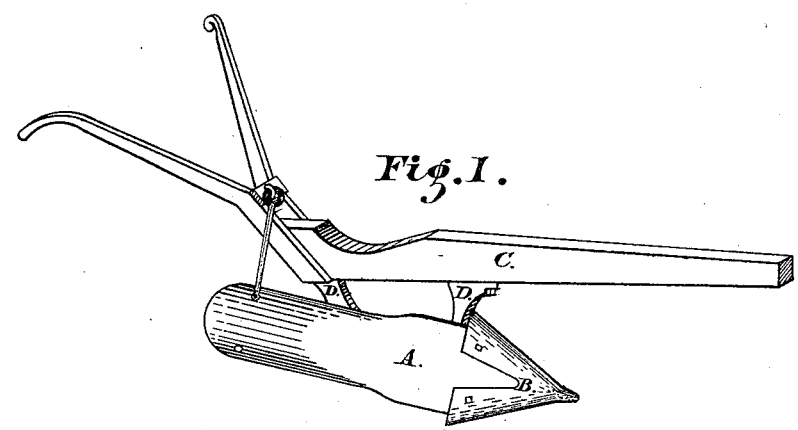
Figure 2:
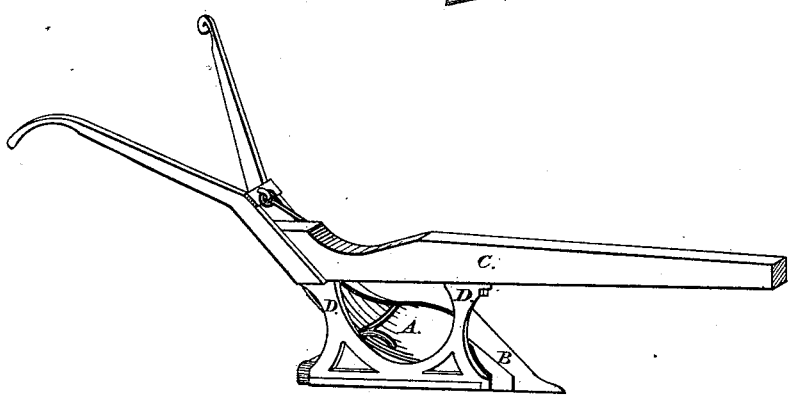

Figure 1 is a side elevation of my plow. Fig. 2 is the same with the mold-board reversed. Fig. 3 is a top plan of the mold-board. Fig. 4 is a side elevation of the same; Fig. 5, a cross-section through the line $x\ x$ of Fig. 3; Fig. 6, a cross-section through the line $y\ y$ of Fig. 3; Fig. 7, the same through the line $z\ z$ of Fig. 3; Fig. 8, same through line $x'\ x'$ of Fig. 3; Fig. 9, same through line $y'\ y'$ of Fig. 3; Fig. 10, same through line $z'\ z'$ of Fig. 3.

My invention relates to reversible or swivel plows.

My object is to produce a swivel-plow that will do equally good work upon level land as the common plow of equal size, giving the same range of work for both depth and width. All other swivel-plows have failed to accomplish this result.

My invention consists in a combination, in the mold-board, of a flat and a convex surface, the forward part being made as nearly flat as consistent with a double-winged or swivel point, and a flat surface retained as far as possible.

In the drawings, C represents the plow-beam, and D the plow-standard. The mold-board A is connected in the ordinary manner with the point B, which is of substantially the ordinary construction. Its shape will be understood from an inspection of Figs. 8, 9, and 10 of the drawings, which show sections of the point at different places. At the line $x'\ x'$ the mold-board is united with the point, and of necessity must conform to the latter, in order that the line of union be a smooth surface. (See Fig. 8.) From the points 1 to 7 and 4 to 8 the mold-board is slightly concave. From the line $x'\ x'$ to the line $z\ z$ the change in shape to a plain surface is as rapid as possible. This line $z\ z$ is about one-half of the width of the mold-board in the rear of the line $x'\ x'$. From this line $z\ z$ the surface changes as gradually as possible to a convex surface, preserving a plain surface at the center of the board more than at the sides. Thus the lines 2 6 and 3 5 are straight lines. The further change of the shape of the surface of the board is illustrated by Figs. 6 and 5. It is understood that the parts of the board on either side of the line $A'\ A'$ are similar.

This construction of the board, by retaining a flat surface as far as possible, allows the furrow to pass well up upon the board, when the convexity at the rear of the board allows the furrow to pass under the rear end with a twisting motion in such a manner as not to lap the furrows, but allow each furrow to drop into the place from which the previous furrow was taken, completely inverting the sod and leaving the ground level and smooth, thus greatly facilitating the preparation of the land in a suitable manner for the crops.

It may be added that the line $A'\ A'$ is a straight line from near the point where it is intersected by the line $y'\ y'$ to about the point where it is intersected by the line $y\ y$.

What I claim as my invention is—

A mold-board and point for swivel-plows, the surface of which consists of combined concave, plane, and convex surfaces arranged in relation to each other, as shown and described.

In testimony that I claim the foregoing I have hereunto set my hand this 16th day of August, 1886.

FREEMAN C. MERRILL.

Witnesses:
GEORGE E. BIRD,
AUGT. SMITH.